150# United States Patent

[11] 3,619,209

[72] Inventors Joseph L. Hegadorn;
 Robert R. Ferguson; Bernard J. Bahoshy,
 all of Dover, Del.
[21] Appl. No. 754,470
[22] Filed Aug. 21, 1968
[45] Patented Nov. 9, 1971
[73] Assignee General Foods Corporation
 White Plains, N.Y.

[54] PUDDING COMPOSITION CONTAINING LIPID ESTER
 12 Claims, No Drawings
[52] U.S. Cl. .................................................. 99/139
[51] Int. Cl. .................................................. A23l 1/14
[50] Field of Search .......................................... 99/139,
 131, 92; 127/71

[56] References Cited
UNITED STATES PATENTS
| 2,461,139 | 2/1949 | Caldwell | 99/139 X |
| 3,231,391 | 1/1966 | Breivik | 99/139 |
| 3,257,214 | 6/1966 | McDermott | 99/131 X |

OTHER REFERENCES
Atlas Surfactants, Atlas Chemical Industries, Wilmington, Delaware, 1963, p. 4.

Primary Examiner—Raymond N. Jones
Assistant Examiner—J. M. Hunter
Attorneys—Thomas V. Sullivan and Bruno P. Struzzi ABSTRACT: A pudding mix composition includes, in combination with an amylaceous ingredient, a lipid ester surface active agent. The preparation of a cooked pudding therefrom is considerably simpler and is more tolerant of recipe preparation errors in that the tendency of the pudding to stick to the pan and to scorch the pan during preparation is reduced or eliminated.

PUDDING COMPOSITION CONTAINING LIPID ESTER

BRIEF SUMMARY OF THE INVENTION

This invention relates to a pudding mix composition and more particularly to a pudding mix composition in the form of a dry powder which may be mixed with water and/or milk and cooked to form a pudding of superior characteristics. Still more particularly, this invention relates to a pudding mix composition offering considerable advantages to the consumer and housewife in preparing a cooked pudding therefrom.

Pudding mix compositions presently available may generally be classified as two types: instant and cooked. In the so-called instant puddings, the characteristic firmness and texture is usually obtained by the use of coagulating agents such as calcium salts, phosphate salts, enzymes and the like. These coagulating agents serve to act on the milk protein and to modify it in a manner whereby added thickening agents as, for example, pregelatinized starches, gums, hydrocolloids, and the like, function in a secondary role by furnishing additional firmness and texture to the pudding. On the other hand, in cooked puddings the desired firmness and texture are achieved by the use of raw starches or other amylaceous materials including cornstarch, potato starch, tapioca starch, rye flour, wheat flour, and the like. In conventional cooked pudding mix compositions, raw cornstarch is widely used as the sole setting or gelling agent and during cooking the starch is converted, by gelatinization, to the sought-after firmness and texture associated with cooked puddings. However, unless care in preparation is exercised, a conventional cornstarch-containing pudding may "stick" to the pan, pot or vessel in which it is cooked. Moreover, if the cooked pudding is allowed to remain over the heat source too long, the pudding may "scorch" and may form and deposit a difficult-to-remove layer on the bottom and walls of the pan, pot, or vessel. While proper agitation and stirring of the pudding mix and reconstituting liquid and control of cooking temperatures and times may reduce sticking or scorching, constant attention on the part of the consumer and housewife in the preparation of the pudding is required.

Although attempts have been made to avoid these disadvantages of conventional cooked pudding mix compositions, such efforts have not been wholly successful. For example, potato starch, tapioca starch, rye flour, wheat flour, and combinations thereof have been substituted for all or part of the cornstarch to provide pudding mix compositions which do not have to be cooked to a "full rolling boil" during preparation. Yet, sticking and scorching may still result especially if a consumer or housewife overlooks recipe directions calling for constant stirring or is interrupted in the preparation of the cooked pudding.

It is an object of this invention to provide a pudding mix composition which is adapted to furnish a pudding having a decreased need for continued stirring during preparation.

It is a further object of this invention to provide a cooked pudding mix composition in which the tendency of the pudding to stick to the pan, pot or vessel and/or to scorch if accidentally or intentionally overcooked is reduced or eliminated.

The foregoing objects as well as others are realized by including in a pudding mix composition containing any amylaceous ingredient a lipid ester base surface active agent.

DETAILED DESCRIPTION

The pudding mix composition thus contains a lipid ester base surface active agent in an amount effective to simplify pudding preparation by reducing the need for constant stirring and to afford scorch-resistance. Such surface active agent may be any of a large number including mono- and diglycerides of fatty acids, polyoxyethylene ethers of mixed fatty acid esters of sorbitan, fatty acid esters of sorbitan, glycol esters of fatty acids, acetylated mono- and diglycerides, and the like.

While emulsifiers and oils may have been included in known pudding mix compositions, their use has been for increased wetting, for decreased foaming, and/or for reduced dusting. Thus, in known instant pudding mix compositions, certain emulsifiers have been incorporated to minimize foam when the compositions are admixed with cold milk. It is apparent, however, that sticking and/or scorching, as are frequently encountered in cooked pudding preparations, are not problems of concern with instant puddings.

Suprisingly, it has been found that by adding a minor but effective amount of lipid ester base surface active agent a good degree of scorch resistance can be imparted to a cooked pudding. The pudding mix composition may contain a conventional raw, amylaceous ingredient such as cornstarch, potato starch, tapioca starch, and the like and combinations thereof. Amylaceous flours, e.g., tapioca, wheat and rye, modified amylaceous ingredients, e.g., modified starches, and mixtures may also be included.

In a preferred embodiment, the amylaceous ingredient is cornstarch and the modified amylaceous ingredient is a modified cornstarch. (The combination of a modified amylaceous ingredient with an amylaceous ingredient in a cooked pudding mix composition is more fully described and is claimed in our copending application, Ser. No. 754,471, filed concurrently herewith.) The modified cornstarch is one whose gelation characteristics have been substantially altered from those commonly found in raw cornstarch. The modified cornstarch is characterized by its minimized tendency toward retrogradation and by its ability to form a thick, clear, soft-textured gel when cooked to its gel point which is lower than that of an unmodified cornstarch. It appears that the modified cornstarch does not set up, that is, form a rigid, irreversible gel, but instead because of the minimized tendency toward retrogradation control of the texture of the pudding is achieved.

The amount of lipid ester surface active agent which may be used to bring about the need for less stirring during preparation and the desired scorch-resistance may be varied. Thus, depending upon the type of surface active agent and the kind and amount of amylaceous ingredient or ingredients as well as of other ingredients such as sugars which are employed, the amount, by weight, may be from about 0.05 to about 2.0 percent based on the total pudding mix composition. When polyoxyethylene (20) sorbitan monostearate (also referred to as Polysorbate 60) is used, which is a preferred embodiment, the amount may range from about 0.1 to about 0.5 percent, by weight, of the pudding mix. Sorbitan tristearate and/or sorbitan monostearate may be included therewith to provide approximately 1 percent total, based on the weight of the pudding mix, of surface active agents.

The surface active agent may be incorporated with some of the ingredients of the pudding mix, usually sugar, flavor and color, and the blend is then admixed with the remaining ingredients. Color intensification appears to result from this mode of addition. Alternatively, and preferably, the surface active agent is blended with the total pudding mix ingredients. The surface active agent may, if desired, be first incorporated in a carrier, such as an oil or solvent, and then blended with the pudding mix ingredients.

The pudding mix composition may also comprise a thin boiling colloidal or cellulose gum system as provided for by including carrageenan, pectin, algin, or a cellulose derivative and combinations thereof. The colloids or gums while not essential, may be included in amounts, by weight, ranging from 0 to about 10 percent of the raw amylaceous ingredient. Preferably, seaweed extract gum as, for example, carrageenan or algin is employed as as to provide additional firmness in the pudding.

Other ingredients in the pudding mix composition may include sugars such as sucrose, dextrose, lactose, corn syrup solids and the like. Nonnutritive sweetening agents such as cyclamates, saccharins and the like may also be employed to replace all or part of the sugars. Salt, flavor, and color may, of course, be added to the pudding mix composition. If desired, nonfat or whole milk solids and bulking ingredients as, for example, nonsweetening carbohydrates may also be used.

Suitable levels in grams except for the surface active agent whose amount is expressed as a percentage of the total mix, of the various ingredients for use with one pint of milk are, for example:

| Ingredient | Amount |
|---|---|
| Sugar | 40–80 |
| Raw Starch | 10–30 |
| Modified Starch | 0–15 |
| Flours or other raw starches | 0–15 |
| Colloid or gum | 0–3 |
| Salt | 1/4–3 |
| Flavor/color | As needed |
| Surface active agent | 0.05–2 |

In order to illustrate, but not to limit, the present invention, the following examples are given:

EXAMPLE 1

A powdered vanilla pudding mix is prepared by blending in a ribbon blender, 60 parts of sucrose, 10 parts of dextrose, 28 parts of raw cornstarch, 1.5 parts of salt, and color and flavor as desired. To the blend is then added 0.15 part of Polysorbate 60 and the mix is further intimately blended.

3 to 3½ ounces of the resulting composition are added to 2 cups of whole milk. The admixture is cooked to a boil over medium heat with only a minimum amount of stirring. The cooked pudding is then allowed to cool to develop its set.

It was noted that the pudding texture and flavor were not affected but that scorch resistance had been achieved. Moreover, it was observed that tendency toward sticking to the cooking vessel was not apparent.

EXAMPLE 2

A dry vanilla pudding mix is made by blending 55 parts of sucrose, 20 parts of dextrose, 20 parts of raw cornstarch, 4 parts of modified cornstarch ("Delta Food Starch 07444"), 1.5 parts of salt, 0.2 part of Polysorbate 60, and color and flavor as desired in a ribbon mixer for 20 minutes.

3 to 3½ ounces of the blended mix are added to 2 cups of whole milk. The admixture is then cooked to a boil over medium heat. The cooked pudding is then allowed to cool to develop its set.

EXAMPLE 3

The procedure of example 2 is repeated in all essential respects except that 0.15 part of calcium carrageenan is included in the formulation.

EXAMPLE 4

A dry chocolate flavor pudding mix is made by blending 60 parts of sucrose, 15 parts of raw cornstarch, 13 parts of cocoa powder, 5 parts of modified cornstarch ("Delta Food Starch 07444"), 4 parts of tapioca flour, 1 part of salt, 0.3 part of calcium carrageenan, 0.15 part of Polysorbate 60, color and flavor as desired in a ribbon mixer for 20 minutes.

3½ to 4 ounces of the blended mix are added to 2 cups of whole milk. The admixture is then cooked to a boil over medium heat. The cooked pudding is then allowed to cool to develop its set.

Results similar to those found for the pudding mix composition of example 1 are noted with examples 2, 3, and 4.

It is apparent that the pudding mix compositions of the present invention are extremely tolerant of variations in recipe preparations. Such tolerance and scorch resistance offer considerable convenience to the user as does the diminished need for stirring during cooking.

While the present invention has been described with particular reference to specific embodiments the same are not to be considered as being in any way limitative but rather reference should be had to the appended claims for a definition of the invention.

We claim:

1. A pudding mix composition comprising, in combination, a raw amylaceous ingredient and a lipid ester base surface active agent, said surface active agent present in an effective amount such that on cooking said composition a pudding having a reduced tendency toward sticking to the cooking vessel is obtained.

2. A composition as in claim 1 in which said surface active agent is a polyoxyethylene ether of a fatty acid ester of sorbitan.

3. A composition as in claim 2 in which said ester is polyoxyethylene (20) sorbitan monostearate.

4. A composition as in claim 2 in which said raw amylaceous ingredient is selected from the group consisting of cornstarch, potato starch and tapioca starch.

5. A composition as in claim 4 further comprising a modified cornstarch.

6. A composition as in claim 4 further comprising tapioca flour.

7. A composition as in claim 4, further comprising a member selected from the group consisting of carrageenan, pectin, algin and cellulose derivatives.

8. A composition as in claim 7 in which said member is carrageenan.

9. A composition as in claim 8 further comprising sugar, salt flavor, and color.

10. A composition as in claim 5 further comprising tapioca flour.

11. A composition as in claim 5 further comprising a member selected from the group consisting of carrageenan, pectin, algin, and cellulose derivatives.

12. A composition as in claim 6 further comprising a member selected from the group consisting of carrageenan, pectin, algin, and cellulose derivatives.

* * * * *